United States Patent [19]

Kitada et al.

[11] Patent Number: 5,022,664
[45] Date of Patent: Jun. 11, 1991

[54] METAL GASKET FOR JOINT STRUCTURE

[75] Inventors: Taizo Kitada; Yoshiaki Danno, both of Kyoto; Masahiko Takagi, Kusatsu; Toshihiko Uchida, Otsu; Yutaka Yamamoto, Toyonaka, all of Japan

[73] Assignee: Mitsubishi Jidosha Kogyo Kabushiki Kaisha, Toyonaka, Japan

[21] Appl. No.: 340,205

[22] Filed: Apr. 19, 1989

[30] Foreign Application Priority Data

Apr. 19, 1988 [JP] Japan .................. 63-52643[U]

[51] Int. Cl.⁵ .............................................. F16J 15/08
[52] U.S. Cl. .................. 277/236; 277/235 B; 123/41.09; 236/34.5
[58] Field of Search ............. 277/236, 235 B; 123/41.09; 236/34, 34.5; 285/917; 220/89 A

[56] References Cited

U.S. PATENT DOCUMENTS

| | | | |
|---|---|---|---|
| 2,543,963 | 3/1951 | Gaffin | 277/235 B X |
| 2,765,983 | 10/1956 | Mayo | 236/34.5 X |
| 3,080,171 | 3/1963 | Booth | 277/236 X |
| 3,172,602 | 3/1965 | Drapeau | 236/34.5 |
| 3,454,220 | 7/1969 | Bentz et al. | 236/34 |
| 4,119,236 | 10/1978 | Shaw et al. | 220/89 A |
| 4,203,608 | 5/1980 | Nicholson | 277/236 X |
| 4,280,654 | 7/1981 | Sliger | 236/34.5 |

Primary Examiner—Allan N. Shoap
Assistant Examiner—Scott Cummings
Attorney, Agent, or Firm—Wegner, Cantor Mueller & Player

[57] ABSTRACT

A metal gasket for sealing a three-component joint structure in which first and second joint members are disposed in confronting relation so as to align their respective holes with each other and in which an outer peripheral portion of a third joint member is fitted in a recess in the confronting surface of the first joint member. The metal gasket has an opening and is adapted to be placed between the first and second joint members so as to align the opening with the holes of the two joint members. The metal gasket also has, at a position near the opening, a stepped portion defined by first and second bends engageable with the first and second joint members, respectively, as the metal gasket is placed between the two joint members. As the first and second joint members are tightened so as to clamp the third member and the metal gasket, the stepped portion is deformed so as to bring the second bend to a position confronting the third joint member.

24 Claims, 7 Drawing Sheets

METAL GASKET FOR JOINT STRUCTURE

FIELD OF THE INVENTION

The present invention relates to a gasket, and more particularly to a metal gasket for sealing a joint structure, such as where a thermostat is mounted in a passageway through which water flows to cool an engine.

DESCRIPTION OF THE RELATED ART

Conventionally, in multi-cylinder engines, for example, cooling water flows from a radiator to a water jacket of a cylinder block of the engine via a pump and then returns to the radiator via an intake manifold, passing in and through a passageway. As shown in FIG. 10 of the accompanying drawings, in the passageway, specifically at the joint between the passageway part defined by the intake manifold 1 and a water-outlet fitting 2, a wax-type thermostat 3 is mounted. This thermostat 3 serves as a valve to close when the temperature of the cooling water is low, and to open when the cooling water temperature is high.

In FIG. 10, reference numeral 4 (4') designates a sealing gasket (described below); 5, a clamp having a hole through which a screw bolt 6 may extend to tighten the water-outlet fitting 2 and the gasket 4 (4') to the intake manifold 1; 7, an upper radiator hose; 8 a head cover of the engine.

FIG. 9 of the accompanying drawings specifically illustrates the conventional manner in which the above-mentioned thermostat is mounted. As shown in FIG. 9, an intake manifold 1, defining a hole communicating with the passageway, and a water-outlet fitting 2 are arranged with their respective flanges facing each other so as to align their respective holes with each other. The intake manifold 1 has, in a surface thereof facing the water-outlet fitting 2, an annular recess 1A adjacent to an edge portion of the hole. In the annular recess, the outer peripheral portion of the thermostat 3 is to be fitted.

With the outer peripheral portion of the thermostat 3 fitted in the annular recess 1A of the intake manifold 1, a sealing soft gasket 4' is placed between the confronting surfaces of the intake manifold 1 and the water-outlet fitting 2, whereupon the intake manifold 1 and the water-outlet fitting 2 are tightened by means of the screw bolt 6 (FIG. 10) to clamp therebetween the outer peripheral portion of the thermostat 3 and the soft gasket 4'. Thus a sealing has been provided at the joint where the thermostat 3 is attached.

A typical example of the soft gasket 4' is composed of a joint sheet of asbestos as a base substrate, the opposite surfaces of the joint sheet being partly covered with resin by printing.

If there is a difference between the depth of the recess 1A of the intake manifold 1 and the thickness of the outer peripheral portion of the thermostat 3, which happens occasionally, such difference is absorbed by the soft gasket 4' which is recoverably deformable.

However, because the resin is printed on its both surfaces, the soft gasket 4' is expensive to manufacture.

To save cost, it could be considered to use a metal gasket in the hope to seal the above-mentioned joint; but the difference in question cannot be absorbed sufficiently by merely using a metal gasket. With such hypothetical construction, the thermostat 3 tends to shift due to the loose fastening, and an adequate degree of sealing cannot be achieved.

Generally, the foregoing problems would occur also in a joint structure which is composed of a set of first, second and third joint members. The first and second joint member are disposed in confronting relation so as to align their respective holes with each other. The first joint member has, in a surface thereof facing the second joint member, a recess adjacent to an edge portion of the hole. An outer peripheral portion of the third joint member is fitted in the recess of the first joint member and is clamped between the first and second joint members as the first and second joint members are tightened.

SUMMARY OF THE INVENTION

With the foregoing problems in view, it is an object of the present invention to provide a metal gasket for sealing the above-mentioned three-component joint structure adequately without any play or shifting of the third joint member in the recess of the first joint member.

According to the present invention, there is provided a metal gasket for sealing a joint structure composed of a set of first, second and third joint members, the first and second joint members disposed in confronting relation so as to align their respective holes with each other, the first joint member having, in a surface thereof facing the second joint member, a recess adjacent to an edge portion of the hole, an outer peripheral portion of the third joint member being fitted in the recess of the first joint member and being clamped between the first and second joint members as the first and second joint members are tightened, wherein the metal gasket has an opening substantially equal in size to the holes of the first and second joint members and is adapted to be disposed between confronting surfaces of the first and second joint members so as to align the opening with the holes of the first and second joint members, the metal gasket further having, in an edge portion of the opening adapted to be disposed adjacent to the recess of the first joint member, a stepped portion defined by first and second bends adapted to contact the first and second joint members, respectively, the second bend of the stepped portion being adapted to be disposed in confronting relation to the third joint member as the first and second joint members are tightened so as to clamp therebetween the third joint member and the metal gasket.

With this arrangement, the above-mentioned object of the present invention can be achieved.

Many other advantages, features and additional objects of the present invention will be manifest to those versed in the art upon making referennce to the detailed description and the accompanying drawings in which a certain structural embodiments incorporating the principles of the present invention are shown by way of illustrative example.

DETAILED DESCRIPTION OF THE PREFERRED EMBODIMENTS

Figure 10:
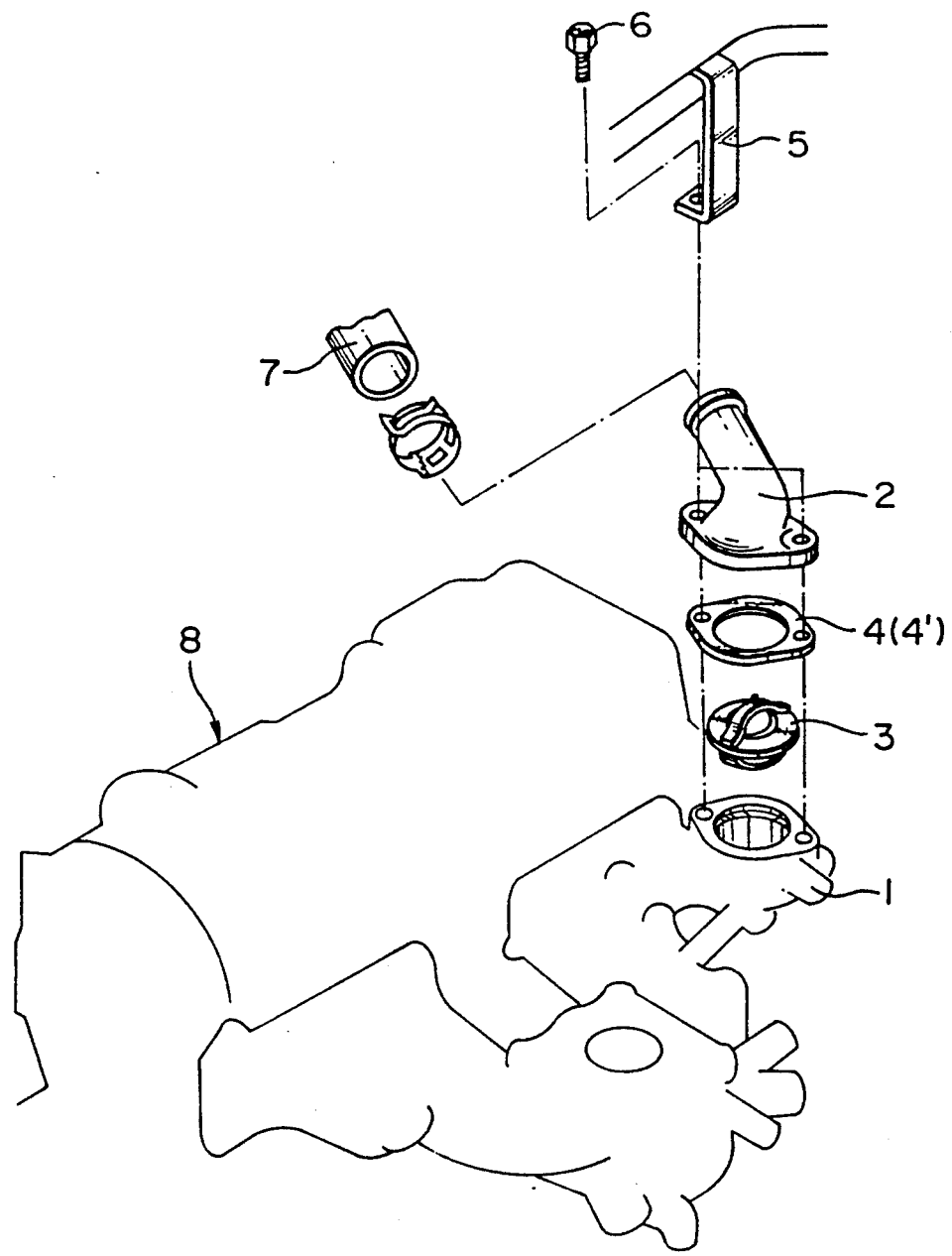
FIG. 10 is an exploded perspective view showing the position of the gasket relative to its associated parts when attaching to an engine.

The principles of the present invention are particularly useful when embodied in a metal gasket for sealing a joint structure in a passageway through which water flows to cool a multi-cylinder engine. Specifically, the joint structure is disposed between the passageway part defined by an intake manifold and a water-outlet fitting as shown in FIG. 10.

Figure 1:
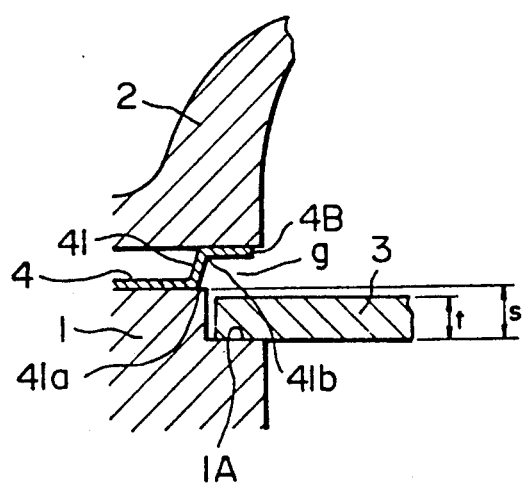
FIG. 1 is a fragmentary cross-sectional view of a joint structure, showing the joint structure before the first and second joint members are tightened to clamp the third joint member and a metal gasket according to a first embodiment of the present invention.
Figure 2:
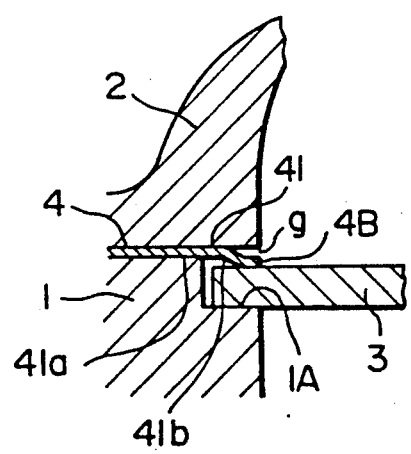
FIG. 2 is a view similar to FIG. 1, but showing the joint structure after the first and second joint members have been tightened to clamp the third joint member and the metal gasket.

As shown in FIGS. 1 and 2, an intake manifold (first joint member) 1, defining a hole communicating with the passageway, and a water-outlet fitting (second joint member) 2 are arranged with their respective flanges facing each other so as to align their holes with each other. The cylinder manifold 1 has, in a surface thereof facing the water-outlet fitting 2, an annular recess 1A adjacent to an edge portion of the hole. In the annular recess, the outer peripheral portion of the thermostat 3 is to be fitted. Thus the thermostat 3 has been mounted.

The depth s of the recess 1A of the intake manifold 1 is larger than the thickness t of the outer peripheral portion of the thermostat 3; that is, t<s.

With the outer peripheral portion of the thermostat 3 received in the recess 1A, a metal gasket 4, having an opening 4B equal in size to the holes of the intake manifold 1 (as seen in FIG. 2) and the water-outlet fitting 2, is placed between confronting surfaces of the intake manifold 1 and the water-outlet fitting 2. The metal gasket 4 also has a stepped portion adapted to be disposed adjacent to the recess 1A of the intake manifold 1. The stepped portion is in the form of a step 41 extending around the edge of the opening 4B and defined by an outer or first bend 41a and an inner or second bend 41b. Thus the first bend 41a of the step 41 is disposed outwardly of the second bend 41b of the same step 41. The first bend 41a is disposed in contact with the intake manifold 1, while the second bend 41b is disposed in contact with the water-outlet fitting 2.

Figure 3:
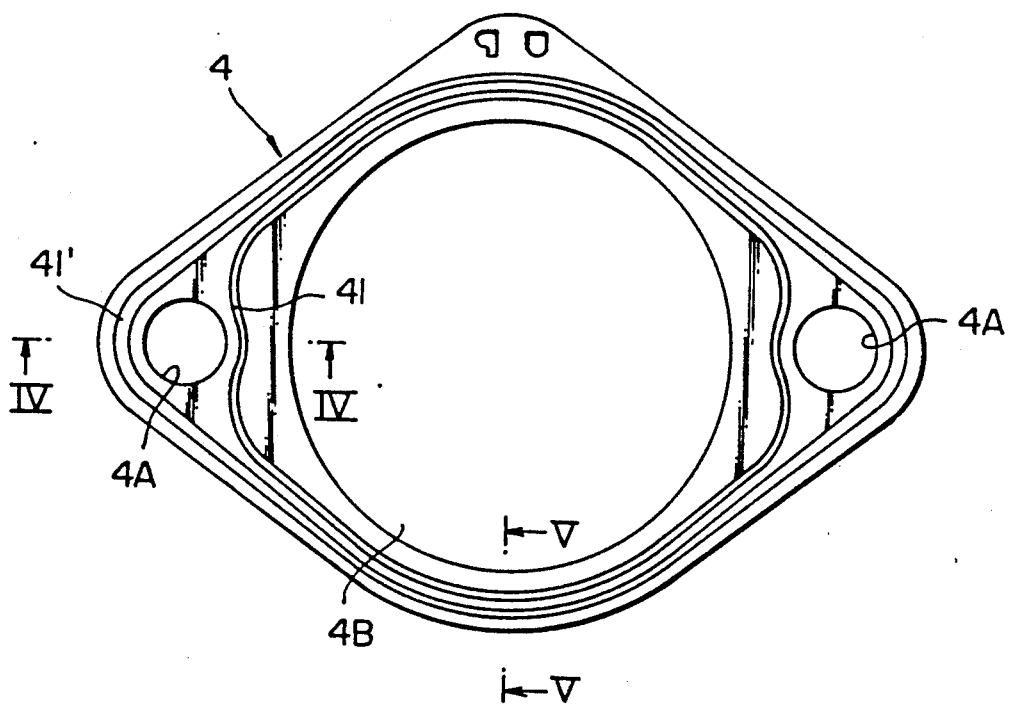
FIG. 3 is plan view of the metal gasket.
Figure 4:
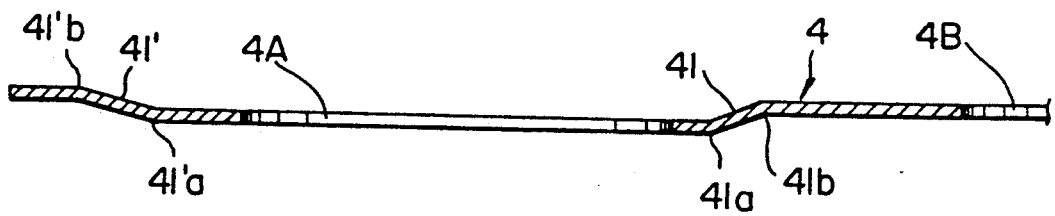
FIG. 4(a) is an enlarged cross-sectional view taken along line IV—IV of FIG. 3.
FIGS. 4(b), 4(c) and 4(d) are views similar to FIG. 4(a), but showing various modifications of the metal gasket of the first embodiment.
Figure 4:
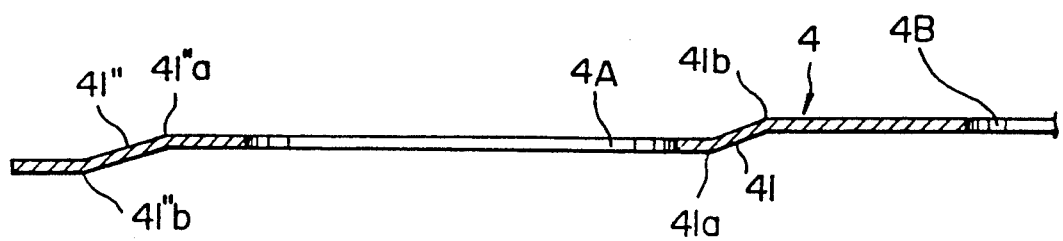
Figure 4:
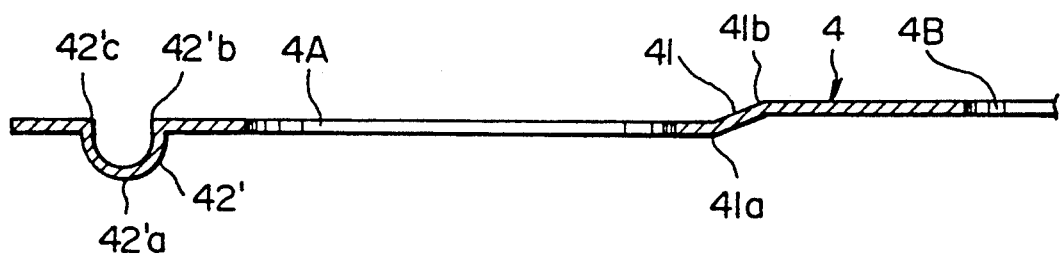
Figure 4:
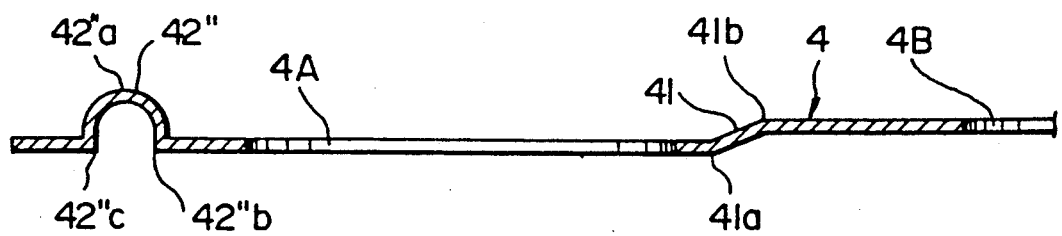
Figure 5:
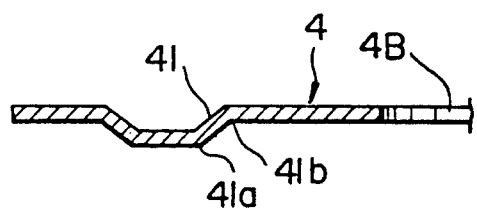
FIG. 5 is an enlarged cross-sectional view taken along line V—V of FIG. 3.

The metal gasket 4, as shown in FIGS. 3, 4(a) and 5, has an additional stepped portion in the form of a step 41' continuously extending along the entire length of an outer peripheral portion of the metal gasket 4. The step 41' has an inner or first bend 41'a adapted to contact the intake manifold 1, and an outer or second bend 41'b adapted to contact the water-outlet fitting 2. Thus the first bend 41'a of the step 41' is disposed inwardly of the second bend 41'b of the same step 41'.

The entire contour of the metal gasket 4 is shown in FIG. 3. FIG. 4(a) is an enlarged cross-sectional view taken along line IV—IV of FIG. 3, and FIG. 5 is an enlarged cross-sectional view taken along line V—V of FIG. 3. Designated by 4A in FIGS. 3, 4(a) and 5 is a hole for a screw bolt.

As the intake manifold 1 and the water-outlet fitting 2 are tightened by the screw bolt 6 (FIG. 10), the step 41 is deformed so as to bring the second bend 41b to a position to confront the thermostat 3, as shown in FIG. 2. That is, after this tightening, the second bend 41b of the step 41 is located at the upper end of a gap g defined between the water-outlet fitting 2 and the thermostat 3.

Further, this tightening causes the edge portion of the opening 4B of the metal gasket 4 to be bent toward the thermostat 3 so as to press thereagainst. This is true partly because the first bend 41a of the step 41 is deformed so as to be flat, and partly because the second bend 41b of the step 41 remains its angled posture due to the presence of the gap g.

With the outer peripheral portion of the thermostat 3 is fitted in the recess 1A of the intake manifold 1, as the metal gasket 4 is placed between the confronting surfaces of the intake manifold 1 and the water-outlet fitting 2, the step 41 of the metal gasket 4 is brought toward the recess 1A of the intake manifold 1. At the same time, the bend 41a of the step 41 is disposed against the intake manifold 1, and the second bend 41b of the step 41 is disposed against the water-outlet fitting 2, as shown in FIG. 1. Meanwhile, the first bend 41'a of the other step 41' is disposed against the intake manifold 1, and the second bend 41'b of the same step 41' is disposed against the water-outlet fitting 2.

Subsequently, when the intake manifold 1 and the water-outlet fitting 2 are tightened by means of the screw bolt 6 (FIG. 10), the step 41 is deformed to cause the second bend 41b to be located at a position to confront the thermostat 3, as shown in FIG. 2. At that time, the edge portion of the opening 4B of the metal gasket 4 presses the thermostat 3.

Upon comletion of the tightening of the intake manifold 1 and the water-outlet fitting 2, the first and second bends 41a, 41b of the step 41 serves to assist in providing a adequate water-tight sealing at the joint of the termostat 3 as the edge portion of the opening of the metal gasket 4 presses the thermostat 3.

Additionally, the outer step 41' of the metal gasket 4 also serves to perform a sealing function, thus guaranteeing a superior water-tight sealing at the joint.

In the first embodiment, the shape of the stepped portion of the metal gasket 4 is not limited to the step 41' of FIG. 4(a). Alternative examples of this stepped portion can be considered. For example, the stepped portion may be in the form of a step 41" stepped in the direction opposite to that of the step 41' of FIG. 4(a), as shown in FIG. 4(b). Also the stepped portion may be in the form of a ridge 42', 42" having a semi-circular cross section, as shown in FIGS. 4(c) and 4(d).

The step 41" of FIG. 4(b) is finally deformed so as to bring the bends 41"a, 41"b in contact with the water-outlet fitting 2 and the intake manifold 1, respectively.

The two ridges 42', 42" bulge in the opposite directions; one ridge 42' bulges toward the intake manifold 1, and the other ridge 42″ bulges toward the water-outlet fitting 2. Accordingly, as the ridge 42′ is finally deformed, the bend 42′a is brought in contact with the intake manifold 1, and the bends 42′b, 42′c are brought in contact with the water-outlet fitting 2. As the ridge 42″ is finally deformed, the bend 42″a is brought in contact with the water-outlet fitting 2, and the bends 42″b, 42″c are brought in contact with the intake manifold 1.

Figure 6:
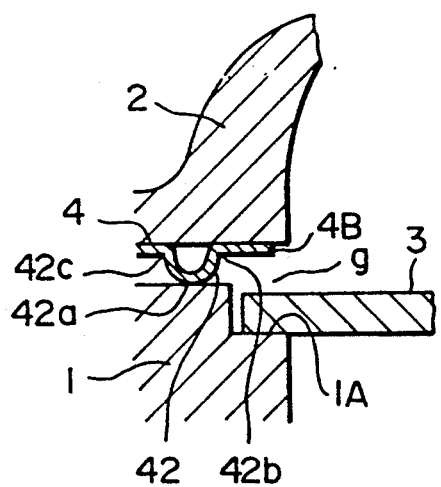
FIG. 6 is a fragmentary cross-sectional view of a joint structure in which a metal gasket is incorporated according to a second embodiment, showing the joint structure before the first and second joint members are tightened to clamp the third joint member and the metal gasket.

FIG. 6 illustrates a second embodiment which is similar to the first embodiment except that the stepped portion of the opening edge portion of the metal gasket 4 has a modified form. In this embodiment, the stepped portion of the metal gasket 4 is in the form of a ridge 42 having a semi-circular cross section and bulging toward the intake manifold 1 and extending around the entire edge portion of the opening 4B which edge is adapted to be disposed adjacent to the recess 1A. The first bend 42a at the lower end of the bulging ridge 42 is disposed in contact with the intake manifold 1, while the inner or second bend 42b and the outer or third bend 42c are disposed in contact with the water-outlet fitting 2. Thus the first bend 42a of the ridge 42 is disposed between the second and third bends 42b, 42c of the same ridge 42.

Figure 7:
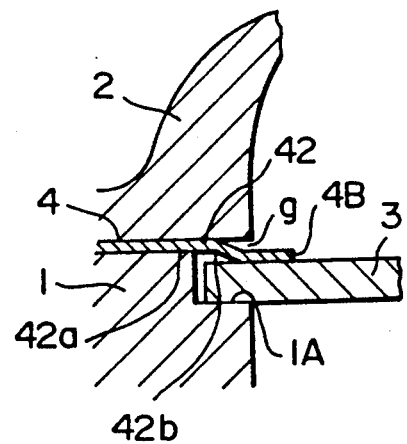
FIG. 7 is a view similar to FIG. 6, showing the joint structure after the first and second joint members have been tightened to clamp the third joint member and the metal gasket.

As the intake manifold 1 and the water-outlet fitting 2 are tightened by means of the screw bolt 6 (FIG. 10), the ridge 42 is deformed as as to bring the second bend 42b to a position confronting the thermostat 3, as shown in FIG. 7. In other words, after this tightening, the second bend 42b of the ridge 42 is disposed at the upper end of a gap g defined between the water-outlet fitting 2.

This tightening causes the edge portion of the opening 4B of the metal gasket 4 to be bent toward the thermostat 3 to press thereagainst. Specifically, upon completion of the tightening, the first and third bends 42a, 42c of the ridge 42 are deformed so as to be flat, and the second bend 42b of the ridge 42 remains its angled shape due to the presence of the gap g. As a result, the edge portion of the opening of the metal gasket 4 is bent toward the thermostat 3 to press thereagainst.

With the outer peripheral portion of the thermostat 3 inserted in the recess 1A of the intake manifold 1, as the metal gasket 4 is placed between the confronting surfaces of the intake manifold 1 and the water-outlet fitting 2, the ridge 42 of the metal gasket 4 is brought to a position near the recess 1A of the intake manifold 1. At that time, the first bend 42a of the ridge 42 is disposed in contact with the intake manifold 1, and the second and third bends 42b, 42c of the ridge 42 are disposed in contact with the water-outlet fitting 2, as shown in FIG. 6.

Subsequently, when the intake manifold 1 and the water-outlet fitting 2 are tightened by means of a non-illustrated screw bolt 6, the ridge 42 of the metal gasket 4 is deformed as as to bring the second bend 42b to a position confronting the thermostat 3, as shown in FIG. 7. At the same time, the edge portion of the opening 4B of the metal gasket 4 is pressed against the thermostat 3.

As a result, the edge portion of the opening of the metal gasket 4 is pressed against the thermostat 3, and the individual bends 42a, 42b, 42c of the ridge 42 serves to assist in sealing the joint of the thermostat 3 with adequate water-tightness.

Alternatively, the metal gasket 4 may have an additional stepped portion, substantially like the stepped portion of the first embodiment, continuously extending along the entire length of the outer peripheral portion of the metal gasket 4. Various examples of this additional stepped portion are shown in FIGS. 8(a) through 8(d). This additional stepped portion of the metal gasket 4 also serves to perform a sealing function, thus guaranteeing a superior water-tight sealing at the joint of the thermostat 3.

Figure 8A:
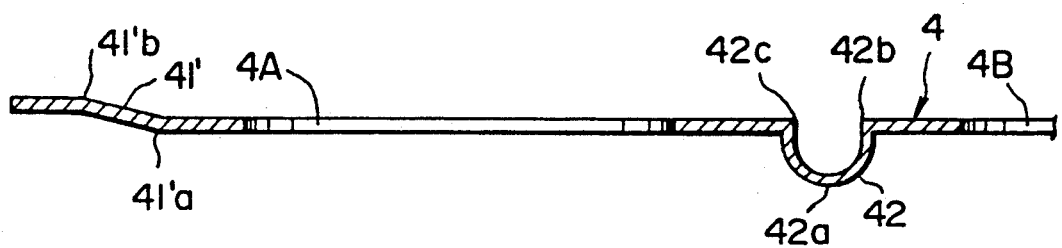
FIGS. 8(a) through 8(d) are cross-sectional views showing various modifications of the metal gasket of the second embodiment.
Figure 8B:
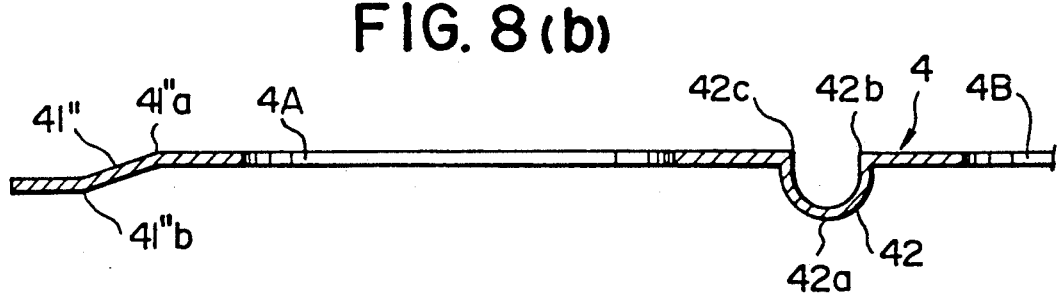
Figure 8C:
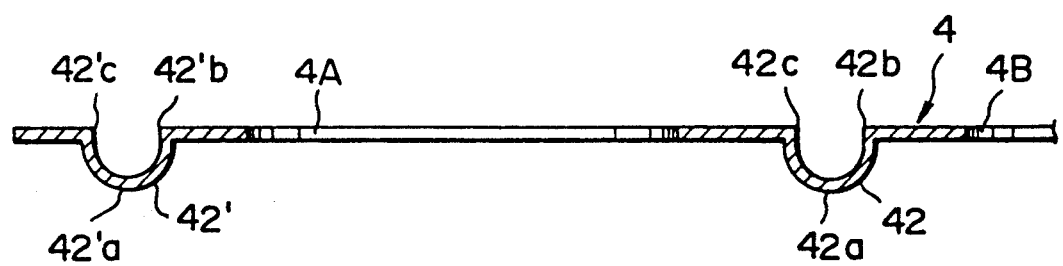
Figure 8D:
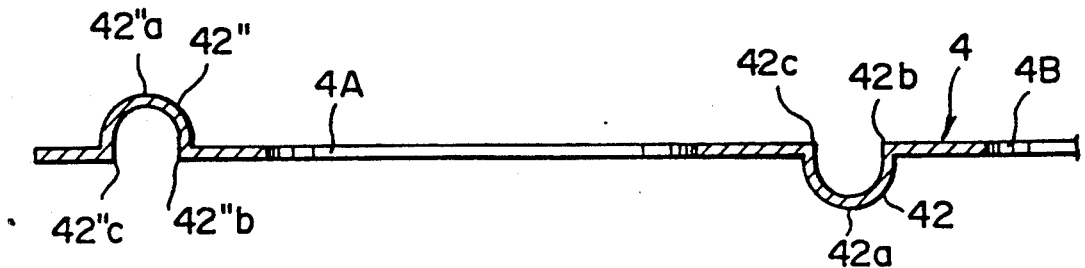
Figure 9:
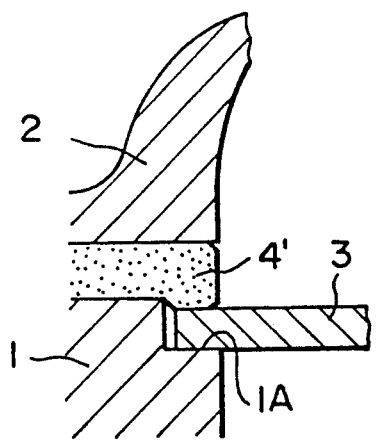
FIG. 9 is a fragmentary cross-sectional view showing a prior art gasket used in a joint structure.

The metal gasket 4 of FIG. 8(a) corresponds to that of FIG. 4(a); similarly, the modified metal gaskets 4 of FIGS. 8(b), 8(c) and 8(d) corresponds those of FIGS. 4(b), 4(c) and 4(d), respectively.

In the foregoing embodiments, the metal gasket of the present invention is used at the joint of the thermostat. However, the present invention is not limited to such embodiments and may be applied to a joint structure which is composed of a set of first, second and third members. The first and second joint member are disposed in confronting relation so as to align their respective holes with each other. The first joint member has, in a surface thereof facing the second joint member, a recess adjacent to an edge of the gap. An outer peripheral portion of the third joint member is fitted in the recess of the first joint member and is clamped between the first and second joint members as the first and second joint members are tightened.

What is claimed is:

1. A metal gasket for sealing a joint structure composed of a set of first, second and third joint members, the first and second joint members defining first and second holes therethrough, respectively and disposed in confronting relation so as to align the first and second holes with each other, the first joint member having, in a surface thereof facing the second joint member, a recess adjacent to an edge portion of the first hole, an outer peripheral portion of the third joint member being fitted in the recess of the first joint member and being clamped between the first and second joint members as the first and second joint members are tightened, wherein said metal gasket has an opening substantially equal in size to the first and second holes of the first and second joint members and is adapted to be disposed between confronting surfaces of the first and second joint members so as to align said opening with the first and second holes of the first and second joint members, said metal gasket further having, in an edge portion of said opening adapted to be disposed adjacent to the recess of the first joint member, a stepped portion defined by first and second bends formed to contact the first and second joint members, respectively; and said stopped portion being formed so that as the first and second joint members are tightened, said first and second bends deform so as to cause the edge portion of said metal gasket to sealingly engage and retain said third joint member, said edge portion being spaced from said second member.

2. A metal gasket according to claim 1, wherein said stepped portion is in the form of a step stepped toward the second joint member.

3. A metal gasket according to claim 1, wherein said stepped portion is in the form of a ridge having a semicircular cross section and bulging toward the first joint member and has a third bend adapted to contact the second joint member, said first bend being disposed between said second and third bends.

4. A metal gasket according to claim 1, wherein said metal gasket has in its outer peripheral portion an additional stepped portion.

5. A metal gasket according to claim 4, wherein said additional stepped portion is in the form of a step stepped toward the second joint member.

6. A metal gasket according to claim 4, wherein said additional stepped portion is in the form of a step stepped toward the first joint member.

7. A metal gasket according to claim 4, wherein said additional stepped portion is in the form of a ridge having a semi-circular cross section and bulging toward the first joint member.

8. A metal gasket according to claim 4, wherein said additional stepped portion is in the form of a ridge having a semi-circular cross section and bulging toward the second joint member.

9. A metal gasket for sealing a joint structure composed of a set of first, second and third joint members, the first and second members defining first and second holes therethrough, respectively and disposed in confronting relation so as to align the first and second holes with each other, the first joint member having, in a surface thereof facing the second joint member, a recess adjacent to an edge portion of the first hole, an outer peripheral portion of the third joint member having a thickness smaller than the depth of said recess, being fitted in the recess of the first joint member and being clamped between the first and second joint members as the first and second joint members are tightened, wherein said metal gasket has an opening substantially equal in size to the first and second holes of the first and second joint members and is adapted to be disposed between confronting surfaces of the first and second joint members so as to align said opening with the first and second holes of the first and second joint members, said metal gasket further having, in an edge portion of said opening adapted to be disposed adjacent to the recess of the first joint member, a stepped portion defined by first and second bends formed to contact the first and second joint members, respectively; and said stepped portion being formed so that as the first and second joint members are tightened, said first and second bends deform so as to cause the edge portion of said metal gasket to sealingly engage and retain said third joint member, said edge portion being spaced from said second member.

10. A metal gasket according to claim 9, wherein said stepped portion is in the form of a step stepped toward the second joint member.

11. A metal gasket according to claim 9, wherein said stepped portion is in the form of a ridge having a semi-circular cross section and bulging toward the first joint member and has a third bend adapted to contact the second joint member, said first bend being disposed between said second and third bends.

12. A metal gasket according to claim 9, wherein said metal gasket has in its outer peripheral portion an additional stepped portion.

13. A metal gasket according to claim 12, wherein said additional stepped portion is in the form of a step stepped toward the second joint member.

14. A metal gasket according to claim 12, wherein said additional stepped portion is in the form of a step stepped toward the first joint member.

15. A metal gasket according to claim 12, wherein said additional stepped portion is in the form of a ridge having a semi-circular cross section and bulging toward the first joint member.

16. A metal gasket according to claim 12, wherein said additional stepped portion is in the form of a ridge having a semi-circular cross section and bulging toward the second joint member.

17. A metal gasket for sealing a joint structure composed of a set of first, second and third joint members, the first and second joint members defining first and second holes therethrough, respectively and disposed in confronting relation so as to align the first and second holes with each other, the first joint member having, in a surface thereof facing the second joint member, a recess adjacent to an edge portion of the first hole, an outer peripheral portion of the third joint member having a thickness smaller than the depth of said recess, being fitted in the recess of the first joint member and being clamped between the first and second joint members as the first and second joint members are tightened, wherein said metal gasket has an opening substantially equal in size to the first and second holes of the first and second joint members and is adapted to be disposed between confronting surfaces of the first and second joint members so as to align said opening with the first and second holes of the first and second joint members, said metal gasket further having, in an edge portion of said opening adapted to be disposed adjacent to the recess of the first joint member, a stepped portion defined by first and second bends formed to contact the first and second joint members, respectively; and said stepped portion being formed so that as the first and second joint members are tightened the edge portion of said opening traverses the space formed due to a dimensional difference between the depth of said recess and the thickness of the outer peripheral portion of said third joint member and said first and second bends are deformed so as to cause the edge portion of said metal gasket to sealingly engage and retain said third joint member, said edge portion being spaced from said second member.

18. A metal gasket according to claim 17, wherein said stepped portion is in the form of a step stepped toward the second joint member.

19. A metal gasket according to claim 17, wherein said stepped portion is in the form of a ridge having a semi-circular cross section and bulging toward the first joint member and has a third bend adapted to contact the second joint member, said first bend being disposed between said second and third bends.

20. A metal gasket according to claim 17, wherein said metal gasket has in its outer peripheral portion an additional stepped portion.

21. A metal gasket according to claim 20, wherein said additional stepped portion is in the form of a step stepped toward the second joint member.

22. A metal gasket according to claim 20, wherein said additional stepped portion is in the form of a step stepped toward the first joint member.

23. A metal gasket according to claim 20, wherein said additional stepped portion is in the form of a ridge having a semi-circular cross section and bulging toward the first joint member.

24. A metal gasket according to claim 20, wherein said additional stepped portion is in the form of a ridge having a semi-circular cross section and bulging toward the second joint member.

* * * * *

UNITED STATES PATENT AND TRADEMARK OFFICE
CERTIFICATE OF CORRECTION

PATENT NO. : 5,022,664

DATED : June 11, 1991

INVENTOR(S) : Taizo Kitada; Yoshiaki Danno; Masahiko Takagi; Toshihiko Uchida; Yutaka Yamamoto It is certified that error appears in the above-identified patent and that said Letters Patent is hereby corrected as shown below:

On the title page, item [73] should be corrected to read as follows:

Assignees: Mitsubishi Jidosha Kogyo Kabushiki Kaisha, Tokyo, Japan; and Kokusan Parts Industry Co., Ltd., Toyonaka, Japan Signed and Sealed this Fifth Day of January, 1993

*Attest:*

DOUGLAS B. COMER

*Attesting Officer*     *Acting Commissioner of Patents and Trademarks*